April 14, 1964 G. A. LALAK 3,128,733
BRAZING JIG FOR ELECTRON TUBE FABRICATION
Filed Dec. 30, 1960 2 Sheets-Sheet 1

INVENTOR.
GEORGE A. LALAK
BY
William A. Zalesake
ATTORNEY

April 14, 1964 G. A. LALAK 3,128,733
BRAZING JIG FOR ELECTRON TUBE FABRICATION
Filed Dec. 30, 1960 2 Sheets-Sheet 2
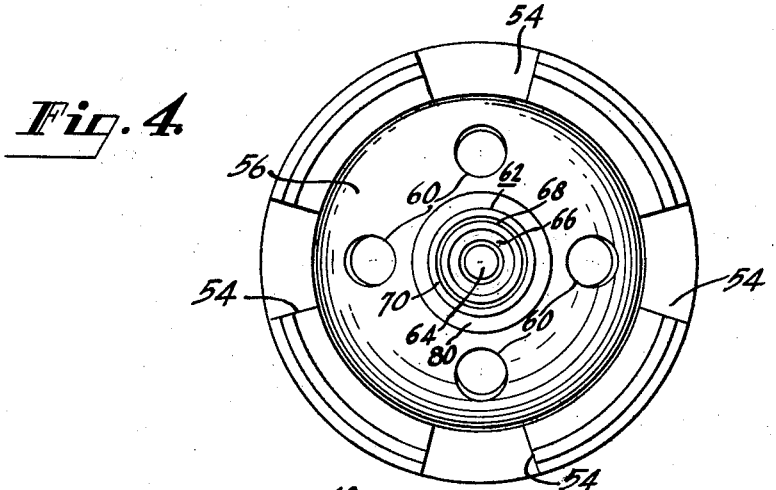
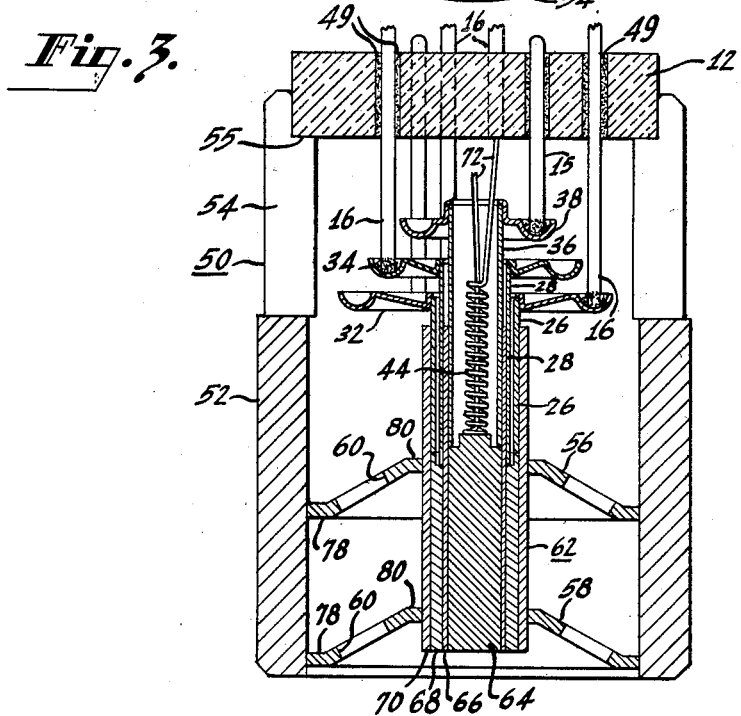
INVENTOR.
GEORGE A. LALAK
BY
William A. Zaleak
ATTORNEY

United States Patent Office 3,128,733
Patented Apr. 14, 1964

3,128,733
BRAZING JIG FOR ELECTRON TUBE
FABRICATION
George A. Lalak, Springfield, N.J., assignor to Radio
Corporation of America, a corporation of Delaware
Filed Dec. 30, 1960, Ser. No. 79,592
5 Claims. (Cl. 113—99)

This invention relates to a brazing jig for use in the manufacture of electron tubes.

The fabrication of one type of electron tube, hereinafter described, employs a jig for supporting a plurality of tube parts in predetermined loose contacting relationship during brazing operations. The coefficients of thermal expansion of the tube parts are different from each other and from the coefficient of thermal expansion of the jig material. A jig suitable for mass production of such a tube should not only avoid the problem of differential thermal expansion between the jig and the tube parts, which, as hereinafter described, may result in poor brazes, but it must also be rugged, accurate, and relatively inexpensive.

Prior art jigs used in fabrication of electron tubes of the type in question have either given unsatisfactory performance with respect to differential expansion problems or else have been undesirably expensive. One type prior art jig which is made of easily machinable but high expansion material has required vibration during brazing to overcome its differential expansion problems. Moreover, excessively massive tube parts have been used in order that the vibration be effective. Another type of prior art jig comprises a combination of materials to eliminate differential expansions. However, this jig is too expensive because of the high cost of the material and machining necessary to make the low expansion material part thereof.

It is therefore an object of my invention to provide a new and improved brazing jig which is rugged, accurate, devoid of differential expansion problems, and yet which is considerably less costly than prior art jigs of the same general class.

According to my invention a brazing jig comprises a housing having a cylindrical opening therein. A pair of centrally apertured dish-like support rings are mounted transversely of the cylindrical opening in the housing. A jigging assembly, preferably comprising concentric stacked tubular elements is mounted within the apertures of and supported by the support rings. The jig is adapted to receive a plurality of tubular electron tube electrodes on the tubular jigging elements. The housing is provided with a shoulder adjacent one end to support a ceramic disk header wafer within the jig during brazing operations.

In the drawings:

FIG. 3 is a longitudinal section of a brazing jig according to my invention in which certain parts of the electron tube of FIG. 1 are disposed; and FIG. 4 is a top plan view of the brazing jig of FIG. 3.

Figure 1:
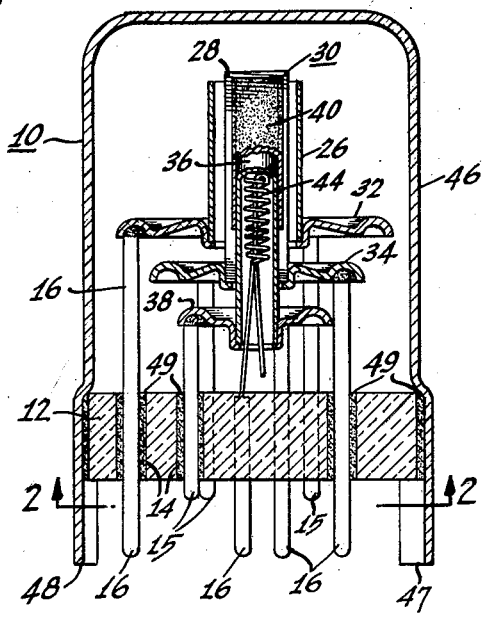
FIG. 1 is a partial longitudinal section of an electron tube suitable for assembly in the brazing jig of my invention.
Figure 2:
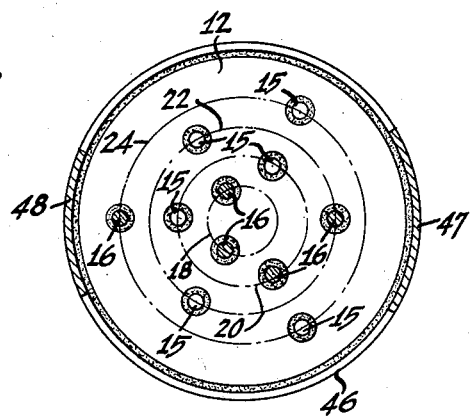
FIG. 2 is a bottom plan view taken along line 2—2 of FIG. 1.

In FIGS. 1 and 2, an electron tube 10 adapted to be fabricated in the brazing jig according to the invention is shown. The tube 10 includes a ceramic disk header 12 having a plurality of bores 14 therethrough. A plurality of electrode support conductors 15 and lead-in conductors 16 are sealed in vacuum-tight relation in the bores 14.

As shown in FIG. 2, the bores 14, and hence conductors 15 and 16, are arrayed in four concentric circles 18, 20, 22, and 24 shown in phantom. Three bores 14 are disposed in 120°, equi-distant, relation on each of the circles. The bores in adjacent circles are angularly displaced 60° to provide maximum spacing therebetween.

The electron tube 10 comprises coaxial cylindrical anode, grid, and cathode electrodes 26, 28, and 30, respectively. The anode 26 is mounted on a radially extending flange 32, which is in turn mounted on one lead-in conductor 16 and two support conductors 15 which extend into bores on the outer circle 24. The grid electrode 28 is similarly mounted on a radially extending flange 34 which is in turn mounted on one lead-in conductor 16 and two support conductors 15 which extend into bores on the circle 22. The cathode 30 comprises a cathode support sleeve 36 mounted on a radially extended flange 38, which is supported on one lead-in conductor 16 and two support conductors 15 extending into bores on the circle 20. The cathode 30 also includes an emissive sleeve 40 which is disposed over the support sleeve 36, and which is coated with a suitable electron emissive material. The inner surface of sleeve 40 and the outer surface of sleeve 36 are sufficiently rough that they may be joined together by sintering. A coiled heater 44 is disposed in the cathode support sleeve 36 and connects to a pair of lead-in conductors 16 which are sealed through two bores on the inner circle 18. A vacuum-tight envelope is provided by a cup-shaped shell 46 which is sealed to the periphery of the ceramic disk header 12. The shell 46 includes a pair of extending arcuate tongues 47 and 48 which serve to protect the externally extending conductors 16 and facilitate socketing of the tube. Both of the conductors 16 connecting to the heater 44 extend through the ceramic header 12 and form terminal prongs. The lead-in conductors 16 of each of the set of three conductors connected, respectively, to the anode, grid, and cathode flanges extend through and beyond the ceramic header 12 to provide terminal prongs.

In one form of the tube 10, the conductors 15 and 16 and the side rods of the grid 28 are made of molybdenum; the cathode support sleeve 36 is principally Nichrome; the anode 26 is nickel, and the flanges 32, 34, and 38 are steel.

In the fabrication of the electron tube 10, a metallic coating 49, such as molybdenum, is applied to the ceramic disk header 12 on its outer periphery and on the walls of the bores 14. Such a coating may be applied by any suitable known metallizing process. It has been found expedient to coat all surfaces of the ceramic disk header 12 with molybdenum and then grind the two planar surfaces thereof to remove the coating therefrom. Thus, only the outer periphery and the walls of the bores 14 are left with a metallized coating 49.

The support flanges 32, 34, and 38 are coated, such as by electroplating, with a brazing material, such as copper. The conductors 15 and 16 are either similarly electroplated or else have washers of brazing material fitted over them and against the header 12. Thus, when the tube parts are assembled, and the assembly is heated to a sufficiently high temperature, vacuum-tight brazed seals are effected between the conductors 15 and 16 and the ceramic disk header 12. Also, the flanges 32, 34, and 38 are brazed to their respective electrodes and conductors. The shell 46 is sealed to the periphery of the ceramic header 12 in a final hard soldering step. The details of the brazing process will be more fully described with reference to FIGS. 3 and 4.

FIGS. 3 and 4 illustrate one form of a brazing jig according to my invention which is suitable for assembling the electron tube of FIGS. 1 and 2. The jig 50 comprises an outer generally cylindrical hollow housing 52. The housing 52 need not be circumferentially continuous at all longitudinal points. In fact, it is preferred that the housing 52 be provided with a plurality of longitudinal slots 54 therein to facilitate the flow therethrough of a reducing gas such as hydrogen during the brazing operation. The longitudinal slots 54 extend from the top of the housing 50 downwardly to any desired extent so long as the housing remains sufficiently rigid. The housing 52 is provided with an internal circumferential shoulder 55 adjacent the top end thereof.

Two centrally apertured dish-like support rings 56 and 58 are transversely mounted within the cylindrical housing 52 in interference fits. One or more openings 60 are provided in both the upper support ring 56 and the lower support ring 58 for the purpose of facilitating an adequate flow of the reducing gas atmosphere through the jig during the brazing operation. The support rings 56 and 58 are preferably substantially less massive than, i.e., not as thick as, the wall of the housing 52.

A jigging assembly 62 is disposed through the central apertures of the support rings 56 and 58 and is fixed to the rings with an interference fit. The jigging assembly 62 comprises a central post 64, an inner jigging cylinder 66, a spacer cylinder 68, and an outer jigging cylinder 70. The inner and outer jigging cylinders 66 and 70 extend upwardly toward the housing shoulder 55 a predetermined distance beyond the upper ends of the center post 64 and the spacer cylinder 68 for the purpose of receiving tube parts thereon. The four elements 64, 66, 68, and 70 of the jigging assembly 62 are assembled with interference fits therebetween.

According to a feature of my invention, the dish-shaped support rings 56 and 58 are so oriented that each one's contact with the jigging assembly 62 is axially closer to the housing shoulder 55 than is its contact with the housing 52. The support rings can also be described as protuberant toward the shoulder 55, or when considered as dished members, that their exterior sides, i.e., their convex sides, face the shoulder 55.

As shown in FIG. 3, the jigging assembly 62 is adapted to receive the cathode support sleeve 36, the grid 28, and the anode 26 in a desired spaced relationship. The inner jigging cylinder 66 is of such internal diameter that the cathode sleeve 36 is snugly received therewithin. The outer diameter of the inner jigging cylinder 66 is such that the grid 28 is snugly received therearound. The inner diameter of the outer jigging cylinder 70 is of such internal diameter that the anode 26 is snugly received therewithin. The wall thickness of the inner jigging cylinder 66 thus determines the spacing between the cathode support sleeve 36 and the grid 28. The wall thickness of the spacer cylinder 68 is such that the desired grid-to-anode spacing is provided. The center post 64 and the spacer cylinder 68 are provided with stepped ends so as to properly longitudinally locate the anode 26, grid 28, cathode sleeve 36, and two legs 72 of the heater coil 44.

The ceramic disk header wafer 12 of the electron tube 10 is received within the cylindrical housing 52 to position it concentrically with respect to the electrodes 26, 28, and 36. The ceramic header wafer 12 is supported on the shoulder 55 to axially space it the desired distance from the electrodes 26, 28 and 36.

In the assembly and fabrication of the electron tube 10, the jig 50 is oriented with the open end up. As shown in FIG. 3, an anode 26, a grid 28, and a cathode support sleeve 36 are loaded into contact with the inner and outer jigging elements 66 and 70. Such loading may be facilitated with a loading device (not shown) which is jigged against the rim of the housing.

An anode flange 32, a grid flange 34, and a cathode flange 38 are desposited in the order named on their respective electrodes. Alternatively, the flanges and electrodes may be assembled as units and simultaneously placed in the jig, the anode and its flange being inserted in the jig first. The two legs 72 of the heater coil 44 are attached to a pair of lead-in conductors 16 which are inserted in properly spaced bores in the ceramic disk header 12. The remaining nine conductors, one lead-in conductor 16, and two support conductors 15 for each electrode flange, are loaded into their proper bores in the header 12. The header 12 is then placed in the housing 52 on the shoulder 55. The conductors 15 and 16 are such that they fit snugly within the bores 14 but are nevertheless slidable therein so that they may drop downwardly and into contact with their respective electrode flanges. Prior to such assembly the ceramic header 12 has been provided with metallic coatings 49 on the outer periphery 48 and the walls of the bores 14 as hereinbefore described. The conductors 15 and 16 and the three electrode support flanges 32, 34, and 38 have been previously provided with a suitable brazing material (not shown).

The assembly of the jig 50 and the electron tube parts shown in FIG. 3 are then inserted in a furnace and heated in a reducing atmosphere to a temperature sufficient to melt the brazing material on the conductors 15 and 16 and on flanges 32, 34, and 38 and fuse the electron tube parts together.

Following this brazing operation, the mount assembly is inverted, the cathode emissive sleeve 40 is placed over the cathode support sleeve 36 and the envelope shell 46 is fitted into contact with the ceramic header 12. A preformed ring of a hard solder is positioned in contact with the tube shell 46 and the ceramic header periphery. This assembly results in a complete tube assembly which is then subjected to a final furnace heating in vacuum. This final processing step serves to evacuate the tube, sinter the cathode emissive sleeve 40 to the cathode support sleeve 36, and solder the shell 46 to the periphery of header 12. The temperature employed in this final step is substantially below the previous brazing temperature. Accordingly, the previously-made brazes are not adversely affected.

In the brazing of the subassembly of the electron tube 10 of FIG. 3, both the tube parts in the jig and the jig itself expand axially. If due to the design of the jig and thermal expansion thereof, the upward movement of that portion of the jig which supports the disk header 12 is greater than the total axial expansion of the tube parts and the upward movement of that portion of the jig which supports them, the ceramic header 12 will be lifted upwardly and possibly carry the conductors 15 and 16 out of contact with their respective electrode flanges 32, 34, and 38. If the lifting occurs before the brazing is completed, the conductors 15 and 16 may not become attached to their respective flanges. Such has been a problem with prior art brazing jigs.

In prior art jigs which have such differential expansion problems, it is known to vibrate the assembly during brazing thereof to cause the conductors 15 and 16 to settle downwardly upon their respective flanges. However, such vibrating is undesirable for at least two reasons. First, it is difficult and expensive to facilitate mass production equipment with suitable vibrators. Second, excessively long conductors 15 and 16 must be provided in order to give suitable mass to the conductors so that they will be settled downwardly by the vibration. Providing of excessively long conductors is wasteful and expensive.

In one type of prior art jig, differential expansion problems are avoided even without the necessity of vibration by making the entire jig of a suitable low expansion material. However, suitable low expansion materials, such as molybdenum, tungsten, and ceramic, are, generally speaking, prohibitively expensive and costly to machine. Moreover, the preferred material, molybdenum, cannot be easily surface conditioned to prevent sticking of the tube parts thereto.

In another type prior art jig hereinbefore briefly described, tubular jigging elements are supported from the base of a cuplike housing, and the part of the jig which serves as the support member for the ceramic header 12 is made of a material which has an axial thermal expansion equal to or less than the total axial thermal expansion of the tube parts, i.e., the electrodes, their flanges and their conductors, assembled in the jig. Specifically, a hollow cylindrical insert of low expansion material, e.g., molybdenum, is disposed within the housing and supports the disk header wafer. Such a jig, while effectively overcoming differential expansion problems, is likewise expensive not only because of the high cost of molybdenum material, but also because fabrication of the molybdenum hollow cylinder insert requires costly machining. Moreover, support of the jigging cylinders from one end only gives rise to the possibility of loss of concentricity through use and handling.

The jig herein described is relatively inexpensive, easily fabricated, and made of less costly materials such as a nickel-chrome alloy sold commercially as Nichrome or Tophet metal. Yet, with the dished support rings 56 and 58, differential expansion problems are overcome.

By virtue of the novel shape and arrangement of the support rings 56 and 58, the entire jigging assembly 62 is shifted axially toward the ceramic header supported on the shoulder 55 when the jig is heated and the parts expand. This is due to the fact that the support rings, rather than being flat along their radial dimensions from their outer peripheral contact with the housing 52 to their inner peripheral contact with the jigging assembly 62, angle upward toward the shouldered end of the housing. Thus, the support rings 56 and 58 include an axial dimension of substantial extent. Because of this, when the support rings thermally expand and the radial dimension is increased, this axial dimension is also increased. Since the outer and inner peripheries of the support rings 56 and 58 are fixed by interference fits, respectively, to the housing 52 and jigging assembly 62, the axial component of expansion of the support rings results in an axial shifting of the jigging assembly relative to the housing 52. Since the support rings 56 and 58 are oriented protuberant or convex toward the shouldered end of the housing 52, the shift of the jigging assembly 62 is toward that end. Although differential expansion of jig and tube parts exist with the use of the jig 50, their adverse effects are overcome since the axial shift of the jigging assembly is such as to more than offset the difference of axial expansion of the housing 52 and the tube parts mounted on the jigging assembly 62.

While the support rings 56 and 58 are illustrated in FIG. 3 to have slightly S-shaped radial section, the dished support rings need not be so specifically shaped. The embodiment of FIG. 3 merely represents one specific shape of support rings which may be preferred for some fabrication considerations. The slight S-shape of the support rings 56 and 58 of FIG. 3 results in short flat radial sections 78 and 80, which permit easier fabrication of the support rings 56 and 58 through use of stamping operations. These flat radial sections 78 and 80 also provide right angle peripheries for making good contact with the housing 52 and jiggering assembly 62. However, the support rings may be more or less S-shaped than shown in FIG. 3. For example, the flat radial sections may be completely omitted.

The axial dimension of the support rings along a radial section can be greater or less than that illustrated in FIG. 3. Generally speaking, an increase of the axial dimension from that shown in FIG. 3 will result in an increase of the axial shift of the jigging assembly effected. The converse is also true with respect to a decrease of the axial dimension. Generally speaking, my invention can be practiced with various radial section shapes of the support rings so long as each one's contact with the jigging assembly 62 is axially closer to the housing shoulder 55 than is its contact with the housing 52.

It is not understood why the dished nature of the support rings 56 and 58 produce the above-described axial shift of the jigging assembly 62. One theory advanced is that, because the thickness of the support rings 56 and 58 is small relative to the wall thickness of the housing 52, when the jig 50 is placed in an oven and raised to brazing temperature, the support rings 56 and 58 are more thoroughly heated throughout than is the housing 52 and thus become hotter than does the housing. The support rings 56 and 58 will accordingly undergo even greater unit expansion than will the housing 52 and, thus affect an even greater axial shift of the jigging assembly 62.

Because of the avoidance of low expansion materials in the construction of the jig 50, a relatively inexpensive structure is provided. Yet, because of the design of the jig 50, harmful effects of differential expansions are overcome. Moreover, according to a feature of my invention, increased ruggedness as compared to prior art jigs is provided by virtue of the preferred spaced two-point support of the jigging assembly 62 rather than a cantilever one-point end support according to prior art construction. In addition, a jig is provided which is a rugged, rigid assembly since it includes no loosely contained parts as do some prior art jigs.

I claim:

1. A brazing jig comprising a housing having a generally cylindrical opening therein, said opening being stepped adjacent one end thereof to provide an internal peripheral shoulder, a centrally apertured dish-shaped support ring mounted transversely within said opening in longitudinal spaced relationship with and protuberant toward said shoulder, and a jigging assembly extending through the aperture of said support ring and supported by said support ring, said jigging assembly having portions facing said shoulder for receiving parts to be brazed.

2. A brazing jig comprising a housing having a generally cylindrical opening therethrough stepped at one end to provide an internal peripheral shoulder, a pair of centrally apertured dish-shaped support rings transversely mounted within said opening in axial spaced relationship with each other and with said shoulder, and a cylindrical jigging assembly extending through the apertures of said support rings and supported by said rings, said assembly comprising a stacked array of concentric tubular elements adapted to receive parts to be brazed in facing relationship with said shoulder, at least one of which tubular elements extends toward said shoulder beyond the end of an adjacent one of said tubular elements, each of said dish-shaped support rings being oriented so that its contact with said jigging assembly is axially closer to said shoulder than is its contact with said housing.

3. The brazing jig according to claim 2 and wherein the thickness of each of said dish-shaped support rings is less than the wall thickness of said housing.

4. A brazing jig adapted to receive in concentric radially spaced relationship a plurality of tubular electron tube electrodes and a disk header wafer coaxial with said electrodes and axially spaced therefrom, said jig comprising a hollow cylindrical housing having an internal peripheral shoulder adjacent one end thereof, a pair of centrally apertured dish shaped support rings mounted transversely within said housing in interference fits therewith and in axially spaced relationship with each other and with said shoulder, and a cylindrical jigging assembly mounted through the central apertures of said support rings in interference fits therewith, said assembly comprising in concentric stacked relationship a center cylinder and three tubular members, said center cylinder and the middle one of said tubular members extending toward said shoulder given distances, both the inner and outer ones of said tubular members extending toward said shoulder substantially further than either of said given distances but substantially short of said shoulder, said support rings being disposed within said housing so that they are protuberant toward said shoulder, said jig being adapted when oriented with said shouldered end of said housing upward to receive said plurality of tubular electrodes in radially spaced concentric relationship on cylindrical surfaces of said inner and outer tubular jigging members and in axial spaced relationship on end surfaces of said center cylinder and said middle tubular member and to support, said disk header wafer transversely within said housing on said shoulder in axial spaced relationship with said electrodes.

5. A brazing jig adapted to receive in concentric radially spaced relationship a plurality of tubular electron tube electrodes and a disk header wafer coaxial with said electrodes and axially spaced therefrom, said jig comprising a hollow cylindrical housing having an internal peripheral shoulder adjacent one end thereof and a plurality of longitudinal slots extending from the shouldered end thereof, a pair of centrally apertured dish-shaped support rings mounted transversely within said housing in interference fits therewith and in axially spaced relationship with each other and with said shoulder, and a cylindrical jigging assembly mounted through the central apertures of said support rings in interference fits therewith, said assembly comprising in concentric stacked relationship a center cylinder and three tubular members, said center cylinder and the middle one of said tubular members extending toward said shoulder given distances, both the inner and outer ones of said tubular members extending toward said shoulder substantially further than either of said given distances but substantially short of said shoulder, each of said support rings being substantially thinner than the wall thickness of said housing and having a generally S-shaped radial section and being oriented so that its contact with said jigging assembly is axially closer to said shoulder than is its contact with said housing, said jig being adapted when oriented with said shouldered end of said housing upward to receive said plurality of tubular electrodes in radially spaced concentric relationship on cylindrical surfaces of said inner and outer tubular jigging members and in axial spaced relationship on end surfaces of said center cylinder and said middle tubular member and to support said disk header wafer transversely within said housing on said shoulder in axial spaced relationship with said electrodes.

References Cited in the file of this patent

UNITED STATES PATENTS

| | | |
|---|---|---|
| 2,310,841 | Curtis | Feb. 9, 1943 |
| 2,433,339 | Brown | Dec. 30, 1947 |
| 2,445,766 | Derby et al. | July 27, 1948 |
| 2,599,394 | Kohl | June 3, 1952 |
| 2,699,516 | Diemer et al. | Jan. 11, 1955 |
| 2,706,232 | Pilas | Apr. 12, 1955 |
| 2,817,607 | Jenny | Dec. 24, 1957 |
| 3,068,825 | Knauf et al. | Dec. 18, 1962 |